United States Patent [19]
Kristinsson et al.

[11] 3,898,229
[45] Aug. 5, 1975

[54] PHOSPHORYL-1,2,4 TRIAZOLES

[75] Inventors: Haukur Kristinsson, Bottmingen; Kurt Rufenacht, Basel, both of Switzerland

[73] Assignee: Ciba-Geigy Corporation, Ardsley, N.Y.

[22] Filed: June 20, 1973

[21] Appl. No.: 371,810

[30] Foreign Application Priority Data
June 30, 1972 Switzerland.......................... 9855/72
May 4, 1973 Switzerland.......................... 6349/73

[52] U.S. Cl............ 260/247.5 E; 71/3; 260/293.69; 260/308 R; 424/248; 424/267; 424/269
[51] Int. Cl...................... C07d 87/40; C07d 55/06
[58] Field of Search .............................. 260/247.5 E

[56] References Cited
OTHER PUBLICATIONS
Kosolapoff, Organophosphorous Compounds, (1950) John Wiley & Sons, pp. 278–281.

*Primary Examiner*—Lorraine A. Weinberger
*Assistant Examiner*—Richard D. Kelly
*Attorney, Agent, or Firm*—Harry Falber; Frederick H. Rabin

[57] ABSTRACT

Phosphoryl-1,2,4-triazoles of the formula

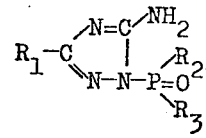

wherein $R_1$ represents methylthio, ethylthio, propylthio, isopropylthio, methylsulphinyl, methylsulphonyl, or

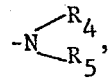

$R_2$ and $R_3$ represent dimethylamino, $R_4$ and $R_5$ each represents methyl, or, together with the nitrogen atom to which they are bonded, represent the piperidino or morpholino radical, a process for their manufacture and their use in pest control.

1 Claim, No Drawings

PHOSPHORYL-1,2,4 TRIAZOLES

The present invention relates to phosphoryl-1,2,4-triazoles, process for their manufacture, and to their use in pest control.

The phosphoryl-1,2,4-triazoles have the formula

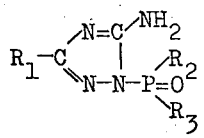

wherein $R_1$ represents methylthio, ethylthio, propylthio, isopropylthio, methylsulphinyl, methylsulphonyl, or

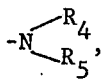

$R_2$ and $R_3$ represent dimethylamino, $R_4$ and $R_5$ each represents methyl, or, together with the nitrogen atom to which they are bonded, represent the piperidino or morpholino radical.

The compounds of the formula I are manufactured in analogous manner to the following known method:

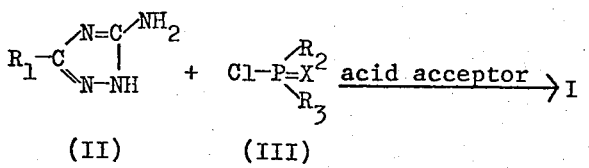

in which process, where $R_1$ represents alkylthio, alkenylthio, alkinylthio, or benzylthio, there subsequently optionally follows an oxidation to corresponding sulphoxides or sulphones.

In the formulae II and III, $R_1$, $R_2$, and $R_3$ have the meanings given for the formula I.

Suitable acid acceptors are: tertiary amines, e.g., trialkylamines, pyridine, pyridine bases, dialkyl anilines; inorganic bases, e.g., hydrides, hydroxides; carbonates and bicarbonates of alkali metals and alkaline earth metals. The process is carried out at a reaction temperature of 0°–150°C, at normal pressure, and in solvents or diluents.

Examples of suitable solvents or diluents are: ether and ethereal compounds, e.g., diethyl ether, dipropyl ether, dioxan, dimethoxy ethane, tetrahydrofuran; amides, e.g., N,N-dialkylated carboxylic acid amides, aliphatic, aromatic, and halogenated hydrocarbons, in particular benzene, toluene, xylene, chloroform, chlorobenzene; nitriles, e.g., acetonitrile; dimethyl sulphoxide, ketones, e.g., acetone, methyl ethyl ketone; water.

Some of the starting materials of the formulae II and III are known and can be manufactured by methods analogous to those described, e.g., in Liebigs Ann. 331 282, 286 (1904).

The compounds of the formula I are suitable for combating various kinds of animal and plant pests. In particular they are suitable for combating insects of the families:

Acrididae, Blattidae, Gryllidae, Gryllotalpidae, Tettigoniidae, Cimicidae, Phyrrhocoridae, Reduviidae, Aphididae, Delphacidae, Diaspididae, Pseudococcidae, Chrysomelidae, Coccinellidae, Bruchidae, Scarabaeidae, Dermestidae, Tenebrionidae, Curculionidae, Tineidae, Noctuidae, Lymantriidae, Pyralidae, Galleriidae, Culicidae, Tipulidae, Stomoxydae, Muscidae, Calliphoridae, Trypetidae, Pulicidae, as well as Acaridae of the families: Ixodidae, Argasidae, Tetranychidae, Dermanyssidae.

By addtion of other insecticides and/or acaricides it is possible to improve substantially the insecticidal or acaricidal action and to adapt it to given circumstances.

The following active substances are examples of suitable additives:
Organic phosphorus compounds
Bis-O,O-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)vinylphosphate cis (MONOCROTOPHOS)
3-(dimethoxyphosphinyloxy)-N,N-dimethyl-cis-crotonamide (DICROTOPHOS)
2-chloro-2-diethylcarbamoyl-1-methylvinyldimethylphosphate (PHOSPHAMIDON)
O,O-diethyl-O(or S)-2-(ethylthio)-ethylthiophosphate (DEMETON)
S-ethylthioethyl-O,O-dimethyl-dithiophosphate (THIOMETON)
O,O-diethyl-S-ethylmercaptomethyldithiophosphate (PHORATE)
O,O-diethyl-S-2-(ethylthio)ethyldithiophosphate (DISULFOTON)
O,O-dimethyl-S-2-(ethylsulphiny)ethylthiophosphate (OXYDEMETON METHYL)
O,O-dimethyl-S-(1,2-dicarbethoxyethyldithiophosphate (MALATHION)
O,O,O,O-tetraethyl-S,S'-methylene-bis-dithiophosphate (ETHION) O-ethyl-S,S-dipropyldithiophosphate
O,O-dimethyl-S-(N-methyl-N-formylcarbamoylmethyl)-dithiphosphate (FORMOTHION)
O,O-dimethyl-S-(N-methylcarbamoylmethyl)-dithiophosphate (DIMETHOATE)
O,O-dimethyl-O-p-nitrophelthiophosphate (PARATHION-METHYL)
O,O-diethyl-O-p-nitrophenylthiophosphate (PARATHION)
O-ethyl-O-p-nitrophenylphenylthiophosphate (EPN)
O,O-dimethyl-O-(4-nitro-m-tolyl)-thiophosphate (FENITROTHION)
O,O-dimethyl-O-2,4,5-trichlorophenylthiophosphate (RONNEL)
O-ethyl-O-2,4,5-trichlorophenylethylthiophosphate (TRICHLORONATE)
O,O-dimethyl-O-2,5-dichloro-4-bromophenylthiophosphate (BROMOPHOS)
O,O-dimethyl-O-(2,5-dichloro-4-iodophenyl)-thiophosphate (JODOFENPHOS)
4-tert.butyl-2-chlorophenyl-N-methyl-O-methylamidophosphate (CRUFOMATE)
O,O-dimethyl-O-(3-methyl-4- methylmercaptophenyl)-thiophosphate (FENTHION)

Isopropylamino-O-ethyl-O-(4-methylmercapto-3-methylphenyl)-phosphate

O,O-diethyl-O-p-(methylsulphinyl)phenyl-thiophosphate (FENSULFOTHION)

O-p-(dimethylsulphamido)-phenyl-O,O-dimethylthiophosphate (FAMPHUR)

O,O,O',O'-tetramethyl-O,O'-thiodi-p-phenylenethiophosphate O-ethyl-S-phenyl-ethyldithiophosphate O,O-dimethyl-O-(α-methylbenzyl-3-hydroxy-crotonyl)phosphate 2-chloro-1-(2,4-dichlorophenyl)vinyl-diethylphosphate (CHLORFENVINPHOS)

1-chloro-1-(2,4,5-trichlorophenyl)vinyl-dimethylphosphate

O-[2-chloro-1-(2,5-dichlorophenyl)]vinyl-O,O-diethylthiophosphate

Phenylglyoxylonitriloxime-O,O-diethylthiophosphate (PHOXIM)

O,O-diethyl-O-(3-chloro-4-methyl-2-oxo-2-H-1-benzopyran-7-yl)-thiophosphate (COUMAPHOS)

2,3-p-dioxandithiol-S,S-bis(O,O-diethyldithiophosphate) (DIOXATHION)

5-[(6-chloro-2-oxo-3-benzoxazolinyl)methyl]O,O-diethyldithiophosphate (PHOSALONE)

2-(diethoxyphosphinylimino)-1,3-dithiolane

O,O,-dimethyl-S-[2-methoxy-1,3,4-thiadiazol-5-(4H)-onyl-(4)-methyl]dithiophosphate O,O-dimethyl-S-phthalimidomethyl-dithiophosphate (IMIDAN)

O,O-diethyl-O-(3,5,6-trichloro-2-pyridyl)thiophosphate

O,O-diethyl-O-2-pyrazinylthiophosphate (THIONAZIN)

O,O-diethyl-O-(2-isopropyl-4-methyl-6-pyrimidyl)-thiophosphate (DIAZINON)

O,O-diethyl-O-(2-quinoxalyl)thiophosphate

O,O-dimethyl-S-(4-oxo-1,2,3-benzotriazin-3(4H)-ylmethyl)-dithiophosphate (AZINPHOSMETHYL)

O,O-diethyl-S-(4-oxo-1,2,3-benzotriazin-3(4H)-ylmethyl)-dithiophosphate (AZINPHOSETHYL)

S-[ (4,6-diamino-s-triazin-2-yl)methyl]-O,O-dimethyldithiophosphate (MENAZON)

O,O-dimethyl-O-(3-chloro-4-nitrophenyl)thiophosphate (CHLORTHION)

O,O-dimethyl-O(or S)-2-(ethylthioethyl)thiophosphate (DEMETON-S-METHYL)

2-(O,O-dimethyl-phosphoryl-thiomethyl)-5-methoxy-pyrone-4-3,4-dichlorobenzyl-triphenylphosphoniumchloride O,O-diethyl-S-(2,5-dichlorophenylthiomethyl)dithiophosphate (PHENKAPTON)

O,O-diethyl-O-(4-methyl-cumarinyl-7)-thiophosphate (POTASAN)

5-amino-bis(dimethylamido)phosphinyl-3-phenyl-1,2,4-triazole (TRIAMIPHOS)

N-methyl-5-(O,O-dimethylthiophosphory)-3-thiavaleramide (VAMIDOTHION)

O,O-diethyl-O-[2-dimethylamino-4-methylpyrimidyl-(6)]-thiophosphate (DIOCTHYL)

O,O-dimethyl-S-(methylcarbamoylmethyl)-thiophosphate (OMETHOATE)

O-ethyl-O-(8-quinolinyl)-phenylthiophosphonate (OXINOTHIOPHOS)

O-methyl-S-methyl-amidothiophosphate (MONITOR)

O-methyl-O-(2,5-dichloro-4-bromophenyl)-benzothiophosphate (PHOSVEL)

O,O,O,O-tetrapropyldithiophosphate 3-(dimethoxyphosphinyloxy)-N-methyl-N-methoxy-cis-crotonamide O,O-dimethyl-S-(N-ethylcarbamoylmethyl)dithiophosphate (ETHOATE-METHYL)

O,O-diethyl-S-(N-isopropylcarbamoylmethyl)-dithiophosphate (PROTHOATE)

S-N-(1-cyano-1-methylethyl)carbamoylmethyldiethylthiolphosphate (CYANTHOATE)

S-(2-acetamidoethyl)-O,O-dimethyldithiophosphate

Hexamethylphosphoric acid triamide (HEMPA)

O,O-dimethyl-O-(2-chloro-4-nitrophenyl)thiophosphate (DICAPTHON)

O,O-dimethyl-O-p-cyanophenyl thiophosphate (CYANOX)

O-ethyl-O-p-cyanophenylthiophosphonate

O,O-diethyl-O-2,4-dichlorophenylthiophosphate (DICHLORFENTHION)

O-2,4-dichlorophenyl-O-methylisopropylamidothiophosphate

O,O-diethyl-O-2,5-dichloro-4-bromophenylthiophosphate (BROMOPHOS-ETHYL)

dimethyl-p-(methylthio)phenylphosphate

O,O-dimethyl-O-p-sulphamidophenylthiophosphate

O-[p-(p-chlorophenyl)-azophenyl]O,O-dimethylthiophosphate (AZOTHOATE)

O-ethyl-S-4-chlorophenyl-ethyldithiophosphate

O-isobutyl-S-p-chlorophenyl-ethyldithiophosphate

O,O-dimethyl-S-p-chlorophenylthiophosphate

O,O-dimethyl-S-(p-chlorophenylthiomethyl)dithiophosphate

O,O-diethyl-p-chlorophenylmercaptomethyl-dithiophosphate (CARBOPHENOTHION)

O,O-diethyl-S-p-chlorophenylthiomethyl-thiophosphate

O,O-dimethyl-S-(carbethoxy-phenylmethyl)dithiophosphate (PHENTHOATE)

O,O-diethyl-S-(carbofluoroethoxy-phenylmethyl)-dithiophosphate

O,O-dimethyl-S-carboisopropoxy-phenylmethyl)-dithiophosphate

O,O-diethyl-7-hydroxy-3,4-tetramethylene-coumarinyl-thiophosphate (COUMITHOATE)

2-methoxy-4-H-1,3,2-benzodioxaphosphorin-2-sulphide

O,O-diethyl-O-(5-phenyl-3-isooxazolyl)thiophosphate 2-(diethoxyphosphinylimino)-4-methyl-1,3-dithiolane tris-(2-methyl-1-aziridinyl)-phosphine oxide (METEPA)

S-(2-chloro-1-phthalimidoethyl)-O,O-diethyldithiophosphate

N-hydroxynaphthalimido-diethylphosphate dimethyl-3,5,6-trichloro-2-pyridylphosphate O,O-dimethyl-O-(3,5,6-trichloro-2-pyridyl)thiophosphate S-2-(ethylsulphonyl)ethyl dimethylthiolphosphate (DIOXYDEMETON-S-METHYL)

diethyl-S-2-(ethylsulphinyl)ethyl dithiophosphate (OXIDISULFOTON)

bis-O,O-diethylthiophosphoric acid anhydride (SULFOTEP)

dimethyl-1,3-di(carbomethoxy)-1-propen-2-yl-phosphate dimethyl-(2,2,2-trichloro-1-butyroyloxyethyl)phosphate (BUTONATE)

O,O-dimethyl-O-(2,2-dichloro-1-methoxyvinyl)phosphate bis-(dimethylamido)fluorphosphate (DIMEFOX)

3,4-dichlorobenzyl-triphenylphosphoniumchloride dimethyl-N-methoxymethylcarbamoylmethyl-dithiophosphate (FORMOCARBAM)

O,O-diethyl-O-(2,2-dichloro-1-chloroethoxyvinyl)-phosphate

O,O-dimethyl-O-(2,2-dichloro-1-chloroethoxyvinyl)-phosphate

O-ethyl-S,S-diphenyldithiolphosphate

O-ethyl-S-benzyl-phenyldithiophosphonate

O,O-diethyl-S-benzyl-thiolphosphate

O,O-dimethyl-S-(4-chlorophenylthiomethyl)dithiophosphate (METHYLCARBOPHENOTHION)

O,O-dimethyl-S-(ethylthiomethyl)dithiophosphate diisopropylaminofluorophosphate (MIPAFOX)

O,O-dimethyl-S-(morpholinylcarbamoylmethyl)dithiophosphate (MORPHOTHION)

bismethylamido-phenylphosphate

O,O-dimethyl-S-(benzenesulphonyl)dithiophosphate

O,O-dimethyl-(S and O)-ethylsulphinylethylthiophosphate

O,O-diethyl-O-4-nitrophenylphosphate triethoxy-isopropoxy-bis(thiophosphinyl(disulphide 2-methoxy-4H-1,3,2-benzodioxaphosphorin-2-oxide octamethylpyrophosphoramide (SCHRADAN)

bis-(dimethoxythiophosphinylsulphido)-phenylmethane

N,N,N',N'-tetramethyldiamidofluorophosphate (DIMEFOX)

O-phenyl-O-p-nitrophenyl-methanethiophosphonate (COLEP)

O-methyl-O-(2-chloro-4-tert.butyl-phenyl)-N-methylamidothiophosphate (NARLENE)

O-ethyl-O-(1,4-dichlorophenyl)-phenylthiophosphonate

O,O-diethyl-O-(4-methylmercapto-3,5-dimethylphenyl)-thiophosphate 4,4'-bis-(O,O-dimethylthiophosphoryloxy)-diphenyl disulphide O,O-di-(β-chloroethyl)-O-(3-chloro-4-methyl-coumarinyl-7)-phosphate S-(1-phthalimidoethyl)-O,O-diethyldithiophosphate O,O-dimethyl-O-(3-chloro-4-diethylsulphamylphenyl)-thiophosphate O-methyl-O-(2-carbisopropoxyphenyl)-amidothiophosphate 5-(O,O-dimethylphosphoryl)-6-chloro-bicyclo(3.2.0)-heptadiene(1,5)

O-methyl-O-(2-i-propoxycarbonyl-1-methylvinyl)-ethylamidothiophosphate.

Nitrophenols and derivatives 4,6-dinitro-6-methylphenol, sodium salt [Dinitrocresol]

dinitrobutylphenol-(2,2',2'')-triethanolamine salt 2-cyclohexyl-4,6-dinitrophenyl [Dinex]

2-1-methylheptyl)-4,6-dinitrophenyl-crotonate [Dinocap]

2-sec.butyl-4,6-dinitrophenyl-3-methyl-butenoate [Binapacryl]

2-sec.butyl-4,6-dinitrophenyl-cyclopropionate 2-sec.butyl-4,6-dinitrophenylisopropylcarbonate [Dinobuton]

Miscellaneous pyrethrin I pyrethrin II 3-allyl-2-methyl-4-oxo-2-cyclopentan-1-yl-chrysanthemumate (Allethrin)

6-chloropiperonyl-chrysanthemumate (Barthrin)

2,4-dimethylbenzyl-chrysanthemumate (Dimethrin)

2,3,4,5-tetrahydrophthalimidomethylchrysanthemumate 4-chlorobenzyl-4-chlorophenylsulphide [Chlorobensid]

6-methyl-2-oxo-1,3-dithiolo-[4,5-b]-quinoxaline (Quinomethionate)

(I)-3-(2-furfuryl)12-methyl-4-oxocyclopent-2-enyl(I)-(cis+trans)-chrysanthemum-monocarboxylate [Furethrin]

2-pivaloyl-indane-1,3-dione [Pindon]

4-chlorobenzyl-4-fluorophenyl-sulphide [Fluorobenside]

5,6-dichloro-1-phenoxycarbamyl-2-trifluoromethyl-benzimidazole [Frenozaflor]

p-chlorophenyl-p-chlorobenzenesulphonate [Ovex]

p-chlorophenyl-benzenesulphonate [Fenson]

p-chlorophenyl-2,4,5-trichlorophenylsulphone [Tetradifon]

p-chlorophenyl-2,4,5-trichlorophenylsulphide [Tetrasul]

p-chlorobenzyl-p-chlorophenylsulphide [Chlorobenside]

2-thio-1,3-dithiolo-(5,6-quinoxaline [Thiochinox]

prop-2-ynyl-(4-t-butylphenyxy)-cyclohexylsulphite [Propargil].

Formamidines 1-dimethyl-2-(2'-methyl-4'-chlorophenyl)-formamidine (CHLORODIMEFORM)

1-methyl-2-(2'-methyl-4'-chlorophenyl)-formamidine 1-methyl-2-(2'-methyl-4'-bromophenyl)-formamidine 1-methyl-2-(2',4'-dimethylphenyl)-formamidine 1-n-butyl-1-methyl-2-(2'-methyl-4'-chlorophenyl)-formamidine 1-methyl-1-(2'-methyl-4'-chloroaniline-methylene)-formamidine 2-(2''-methyl-4''-chlorophenyl-formamidine 1-n-butyl-2-(2'-methyl-4'-chlorophenyl-imino)-pyrolidine.

Urea

N-2-methyl-4-chlorophenyl-N',N'-dimethyl-thiourea.

Carbamates 1-naphthyl-N-methylcarbamate (CARBARYL)

2-butinyl-4-chlorophenylcarbamate 4-dimethylamino-3,5-xylyl-N-methylcarbamate 4-dimethylamino-3-tolyl-N-methylcarbamate (AMINOCARB)

4-methylthio-3,5-xylyl-N-methylcarbamate (METHIOCARB)

3,4,5-trimethylphenyl-N-methylcarbamate 2-chlorophenyl-N-methylcarbamate (CPMC)

5-chloro-6-oxo-2-norborane-carbonitrile-O-(methyl-carbamoyl)-oxime 1-(dimethylcarbamoyl-5-methyl-3-pyrazolyl-N,N-dimethylcarbamate (DIMETILAN)

2,3-dihydro-2,2-dimethyl-7-benzofuranyl-N-methylcarbamate (CARBOFURAN)
2-methyl-2-methylthio-propionaldehyde-O-(methylcarbamoyl)-oxime (ALDICARB)
8-quinaldyl-N-methylcarbamate and its salts
methyl-2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-ter.butylphenyl-N-methylcarbamate
3-sec.butylphenyl-N-methylcarbamate
3-isopropyl-5-methylphenyl-N-methylcarbamate (PROMECARB)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-methylcarbamate (DIOXACARB)
2-(4,5-dimethyl-1,3-dioxolan-2-yl)-phenyl-N-methylcarbamate
2-(1,3-dioxolan-2-yl)phenyl-N,N-dimethylcarbamate
2-(1,3-dithiolan-2-yl)-N,N-dimethylcarbamate
2-(1,3-dithiolan-2-yl)phenyl-N,N-dimethylcarbamate
2-isopropoxyphenyl-N-methylcarbamate (APROCARB)
2-(2-propinyloxy)phenyl-N-methylcarbamate
3-(2-propinyloxy)phenyl-N-methylcarbamate
2-dimethylaminophenyl-n-methylcarbamate
2-diallylaminophenyl-N-methylcarbamate
4-diallylamino-3,5-xylyl-N-methylcarbamate (ALLYXICARB)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate
1-isopropyl-3-methylpyrazol-5-yl-N,N-dimethylcarbamate (ISOLAN)
2-dimethylamino-5,6-dimethylpyrimidin-4-yl-N,N-dimethylcarbamate
3-methyl-4-dimethylaminomethyleneiminophenyl-N-methylcarbamate
3,4-dimethylphenyl-N-methylcarbamate
2-cyclopentylphenyl-N-methylcarbamate
3-dimethylamino-methyleneiminophenyl-N-methylcarbamate (FORMETANATE) and its salts
1-methylthio-ethylimino-N-methylcarbamate (METHOMYL)
2-methylcarbamoyloximino-1,3-dithiolane
5-methyl-2-methylcarbamoyloximino-1,3-oxythiolane
2-(1-methoxy-2-propoxy)phenyl-N-methylcarbamate
2-(1-butin-3-yl-oxy)phenyl-N-methylcarbamate
1-dimethylcarbamyl-1-methylthio-O-methylcarbamyl-formoxime
1-(2'-cyanoethylthio)-O-methylcarbamyl-acetaldoxime
1-methylthio-O-carbamyl-acetaldoxime
O-(3-sec.butylphenyl)-N-phenylthio-N-methylcarbamate
2,5-dimethyl-1,3-dithiolane-2-(O-methylcarbamyl)-aldoxime
O-2-diphenyl-N-methylcarbamate
2-(N-methylcarbamyl-oximino)-3-chloro-bicyclo[2.2.1]heptane
2-(N-methylcarbamyl-oximino)-bicyclo[2.2.1]heptane
3-isopropylphenyl-N-methyl-N-chloroacetal-carbamate
3-isopropylphenyl-N-methyl-N-methylthiomethyl-carbamate
O-(2,2-dimethyl-4-chloro-2,3-dihydro-7-benzofuranyl)-N-methylcarbamate
O-(2,2,4-trimethyl-2,3-dihydro-7-benzofuranyl)-N-methylcarbamate
O-naphthyl-N-methyl-N-acetal-carbamate
O-5,6,7,8-tetrahydronaphthyl-N-methyl-carbamate
3-isopropyl-4-methylthio-phenyl-N-methylcarbamate
3,5-dimethyl-4-methoxy-phenyl-N-methylcarbamate
3-methoxymethoxy-phenyl-N-methylcarbamate
3-allyloxyphenyl-N-methylcarbamate
2-propargyloxymethoxy-phenyl-N-methyl-carbamate
2-allyloxyphenyl-N-methyl-carbamate
4-methoxycarbonylamino-3-isopropylphenyl-N-methyl-carbamate
3,5-dimethyl-4-methoxycarbonylamino-phenyl-N-methyl-carbamate
2-γ-methylthiopropylphenyl-N-methyl-carbamate
3-(α-methoxymethyl-2-propenyl)-phenyl-N-methyl-carbamate
2-chloro-5-tert.-butyl-phenyl-N-methyl-carbamate
4-(methyl-propargylamino-3,5-xylyl-N-methyl-carbamate
4-(methyl-γ-chloroallylamino)-3,5-xylyl-N-methyl-carbamate
4-(methyl-β-chloroallylamino)-3,5-xylyl-N-methyl-carbamate
1-(β-ethoxycarbonylethyl)-3-methyl-5-pyrazolyl-N,N-dimethylcarbamate
3-methyl-4-(dimethylamino-methylmercapto-methyleneimino)phenyl-N-methyl-carbamate
1,3-bis(carbamoylthio)-2-(N,N-dimethylamino)-propanehydrochloride
5,5-dimethylhydroresorcinoldimethylcarbamate
2-[ethyl-propargylamino]-phenyl-N-methylcarbamate
2-[methyl-propargylamino]-phenyl-N-methylcarbamate
4-[dipropargylamino]-3-tolyl-N-methylcarbamate
4-[dipropargylamino]-3,5-xylyl-N-methylcarbamate
2-[allyl-isopropylamino]-phenyl-N-methylcarbamate
3-[allyl-isopropylamino]-phenyl-N-methylcarbamate
Chlorinated Hydrocarbons
γ-hexachlorocyclohexane [GAMMEXANE; LINDAN; γ HCH]
1,2,4,5,6,7,8,8-octachloro-3α,4,7,7α-tetrahydro-4,7-methylene indane [CHLORDAN]
1,4,5,6,7,8,8-heptachloro-3α,4,7,7α-tetrahydro-4,7-methylene indane [HEPTACHLOR]
1,2,3,4,10,10-hexachloro-1,4,4α,5,8,8α-hexahydro-endo-1,4-exo-5,8-dimethanonaphthalene [ALDRIN]
1,2,3,4,10,10-hexachloro-6,7-epoxy-1,4,4α,5,6,7,8,8α-octahydro-exo-1,4-endo-5,8-dimethanonapthalene [DIFLORIN]

1,2,3,4,10,10-hexachloro-5,7-epoxy-1,4,4α,5,6,7,8,8α-octahydro-endo-endo-5,8-dimethanonaphthalene [ENDRIN]

In addition to the properties cited hereinabove, the compounds of the formula I also display activity against representatives of the division Thallophyta. Thus a number of these compounds display bactericidal action. But they are active above all against phytopathogenic fungi which belong to the following classes: Oomycetes, Zygomycetes, Ascomycetes, Basidiomycetes, Denteromycetes. The compounds of the formula I also evidence a fungitoxic action against fungi which attack the plants from the soil. Further, the new active substances are also suitable for freating seeds, fruit, tubers, etc., to protect them from fungus infections. The compounds of the formula I are also suitable for combating plant pathogenic nematodes.

The compounds of the formula I may be used as pure active substance or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology. Mention may also be made of cattle dips and spray races, in which aqueous preparations are used.

The agents according to the invention are manufactured in known manner by intimately mixing and/or grinding active substances of the formula I with the suitable carriers, optionally with the addition of dispersants or solvents which are inert towards the active substances. The active substances may take, and be used in, the following forms:

Solid forms:
Dusts, tracking agents, granules, coated granules, impregnated granules and homogeneous granules.

Liquid forms:
a. active substances which are dispersible in water: wettable powders, pasts emulsions;
b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used singly or in admixture with one another.

Granules can be very easily manufactured by dissolving an active substance of the formula I in an organic solvent and applying the resulting solution to a granulated material, for example attapulgite, $SiO_2$, granicalcium, bentonite, etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 to 600 g/liter can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilise the active substance and/or non-ionic, anionic and cationic surface active substances, which, for example, improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e., wettable powders, pastes and emulsifiable concentrates, are agents which can be diluted with water to any concentration desired. They consist of active substance, carrier, optionally additives which stabilise the active substance, surface-active substance and anti-foam agents and, optionally, solvents.

Wettable powders and pastes are obtained by mixing and grinding the active substances with dispersing agents and pulverulent carriers in suitable apparatus until homogeneity is attained. Suitable carriers are, for example, those mentioned for the solid forms of application. In some cases it is advantageous to use mixtures of different carriers. As dispersing agents there can be used, for example, condensation products of sulphonated naphthalene and sulphonated naphthalene derivatives with formaldehyde, condensation products of naphthalene or naphthalene sulphonic acids with phenol and formaldehyde, as well as alkali, ammonium and alkaline earth metal salts of lignin sulphonic acid, in addition, alkylaryl sulphonates, alkali and alkaline earth metal salts of dibutyl naphthalene sulphonic acid, fatty alcohol sulphates such as salts of sulphated hexadecanols, heptadecanols, octadecanols, and salts of sulphated fatty alcohol glycol ethers, the sodium salt of oleoyl ethionate, the sodium salts of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives cited hereinabove, in such a manner that, the size of the solid particles does not exceed 0.02 to 0.04 μ in wettable powders, and 0.03 μ in pastes. To produce emulsifiable concentrates and pastes, dispersing agents such as those cited above, organic solvents, and water are used. Examples of suitable solvents are: alcohols, benzene, xylene, toluene, dimethyl sulphoxide, and mineral oil fractions which boil between 120° and 350°C. The solvents must be practically odourless, not phytotoxic, and inert to the active substances.

Furthermore, the agents according to the invention can be applied in the form of solutions. For this purpose the active substances, or several active substances of the general formula I, are dissolved in suitable organic solvents, mixtures of solvents or in water. Aliphatic and aromatic hydrocarbons, chlorinated derivatives thereof, alkyl naphthalenes and mineral oils, singly or in admixture with each other, can be used as organic solvents.

The content of active substance in the above described agents is between 0.1 to 9.5 percent, in which connection it should be mentioned that, in the case of application from aircraft or some other suitable means of application, it is possible to use concentrations of up to 99.5 percent or even pure active substance.

The active substances of the formula I can, for example, be formulated as follows:

Dusts

The following substances are used to manufacture (a) a 5 percent and (b) a 2 percent dust:

| a) | 5 | parts of active substance |
|---|---|---|
|   | 95 | parts of talcum |
| b) | 2 | parts of active substance |
|   | 1 | part of highly disperse silicic acid |
|   | 97 | parts of talcum. |

The active substances are mixed with the carriers and ground.

Granules

The following substances are used to produce 5% granules: n

|   | 5 | parts of active substance, |
|---|---|---|
|   | 0.25 | parts of epichlorohydrin, |
|   | 0.25 | parts of cetyl polyglycol ether, |
|   | 3.50 | parts of polyethylene glycol, |
|   | 91 | parts of kaolin (particle size 0.3 - 0.8 mm). |

The active substance is mixed with epichlorohydrin and dissolved with 6 parts of acetone; the polyethylene glycol and cetyl polyglycol ether are then added. The thus obtained solution is sprayed on kaolin, and the acetone subsequently evaporated in vacuo.

Wettable powder

The following constituents are used for the preparation of (a) a 40 percent, (b) and (c) a 25 percent, and (d) a 10 percent wettable powder: n

| (a.) | 40 | parts of active substance, |
|---|---|---|
|   | 5 | parts of sodium lignin sulphonate, |
|   | 1 | part of sodium dibutyl-naphthalene sulphonate, |
|   | 54 | parts of silicic acid. |
| (b) | 25 | parts of active substance, |
|   | 4.5 | parts of calcium lignin sulphonate, |
|   | 1.9 | parts of Champagne chalk/hydroxyethyl cellulose mixture (1:1), |
|   | 1.5 | parts of sodium dibutyl naphthalene sulphonate, |
|   | 19.5 | parts of silicic acid, |
|   | 19.5 | parts of Champagne chalk, |
|   | 28.1 | parts of kaolin. |
| (c) | 25 | parts of active substance, |
|   | 2.5 | parts of isooctylphenoxy-polyoxyethylene-ethanol, |
|   | 1.7 | parts of Champagne chalk/hydroxyethyl cellulose mixture (1:1), |
|   | 8.3 | parts of sodium aluminium silicate, |
|   | 16.5 | parts of kieselguhr, |
|   | 46 | parts of kaolin. |
| (d) | 10 | parts of active substance, |
|   | 3 | parts of a mixture of the sodium salts of saturated fatty alcohol sulphates, |
|   | 5 | parts of naphthalenesulphonic acid/formaldehyde condensate, |
|   | 82 | parts of kaolin. |

The active substances are intimately mixed, in suitable mixers, with the additives, the mixuture being then ground in the appropriate mills and rollers. Wettable powders are obtained which can be diluted with water to give suspensions of any desired concentration.

Emulsifiable concentrates

The following substances are used to produce (a) a 10 percent and (b) a 25 percent emulsifiable concentrate: n

| (a) | 10 | parts of active substance, |
|---|---|---|
|   | 3.4 | parts of epoxidised vegetable oil, |
|   | 13.4 | parts of a combination emulsifier consisting of fatty alcohol polyglycol ether and alkylarylsulphonate calcium salt, |
|   | 40 | parts of dimethylformamide, |
|   | 43.2 | parts of xylene, |
| (b) | 25 | parts of active substance, |
|   | 2.5 | parts of epoxidised vegetable oil, |
|   | 10 | parts of an alkylarylsulphonate/fatty alcohol-polyglycol ether mixture, |
|   | 5 | parts of dimethylformamide, |
|   | 57.5 | parts of xylene. |

From these concentrates it is possible to produce, by dilution with water, emulsions of any desired concentration.

Spray

The following constituents are used to prepare a 5 percent spray:

5 parts of active substance,
1 part of epichlorohydrin,
94 parts of benzine (boiling limits 160° - 190°C).

EXAMPLE 1

To a solution of 65 g of 3-methylthio-5-amino-1,2,4-triazole in 150 ml of pyridine are added dropwise at 0°C 85.3 g of bis-dimethylamido-phosphoric chloride. The mixture is stirred for 30 minutes at 0°C and subsequently for 12 hours at room temperature. The product is precipitated by treating the reaction mixture with 1 liter of water and is filtered off to give the compound of the formula

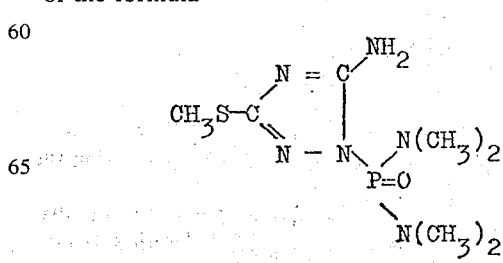

| | C | H | N | P | S |
|---|---|---|---|---|---|
| calculated | 31.80 | 6.48 | 31.79 | 11.71 | 12.13% |
| found | 31.89 | 6.57 | 31.83 | 11.53 | 12.06% | with a melting point of 165°C.

EXAMPLE 2

To a solution of 29 g of 3-ethylthio-5-animo-1,2,4-triazole and 24 g of pyridine in 200 ml of benzene are added dropwise at 0°–20°C 34 g of bis-dimethylamido-phosphoric chloride and the mixture is stirred for 4 hours at 40°C. All volatile components are distilled off in vacuo and the residue is stirred with 100 ml of water. The crystals which have formed are filtered off and recrystallized from acetic acid/petroleum ether to give 23 g of the compound

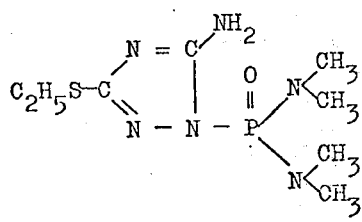

with a melting point of 104°–105.5°C. n

| | C | H | N | P | S |
|---|---|---|---|---|---|
| calculated | 34.52 | 6.88 | 30.19 | 11.15 | 11.52% |
| found | 34.60 | 7.00 | 30.00 | 11.18 | 11.69% |

The following compounds are also manufactured in analogous manner:

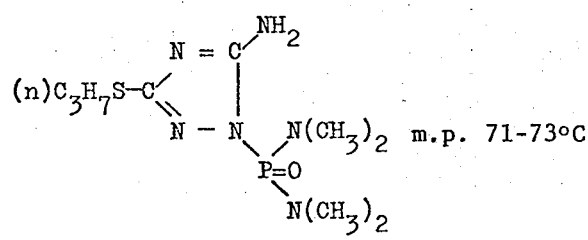
m.p. 71–73°C

| | C | H | N | P | S |
|---|---|---|---|---|---|
| calculated | 37.00 | 7.20 | 28.75 | 10.60 | 10.95% |
| found | 36.80 | 7.30 | 28.90 | 10.60 | 11.00% |

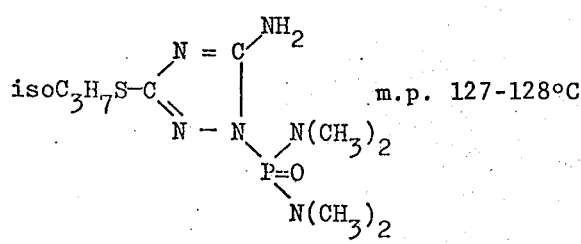
m.p. 127–128°C

| | C | H | N | P | S |
|---|---|---|---|---|---|
| calculated | 36.97 | 7.24 | 28.75 | 10.62 | 10.96% |
| found | 37.03 | 7.32 | 28.60 | 10.66 | 11.08% |

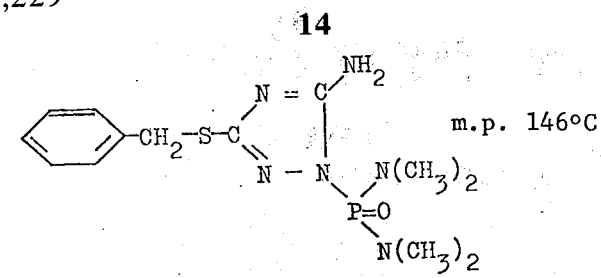
m.p. 146°C

| | | | | | |
|---|---|---|---|---|---|
| calculated | C 45.80 | H 6.20 | N 24.70 | P 9.10 | S 9.40% |
| found | C 49.92 | H 6.19 | N 24.66 | P 8.96 | S 9.68% |

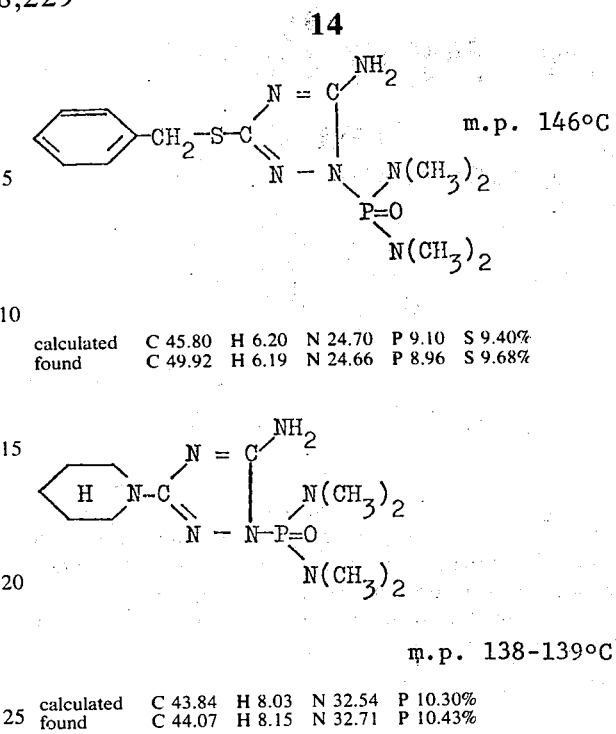

m.p. 138–139°C

| | | | | |
|---|---|---|---|---|
| calculated | C 43.84 | H 8.03 | N 32.54 | P 10.30% |
| found | C 44.07 | H 8.15 | N 32.71 | P 10.43% |

EXAMPLE 3

To a solution of 25.6 g of 3-dimethylamino-5-amino-1,2,4-triazole in 100 ml of pyridine are added dropwise 40 g of bis-dimethylamido-phosphoryl chloride. The mixture is stirred for 16 hours at room temperature. Then excess pyridine is evaporated off in vacuo in a rotary evaporator and the residue is treated with 200 ml of dioxan. Two liquid phases form on heating, of which the upper one is isolated and evaporated. The residue is stirred with cold ether to give 27 g of the compound

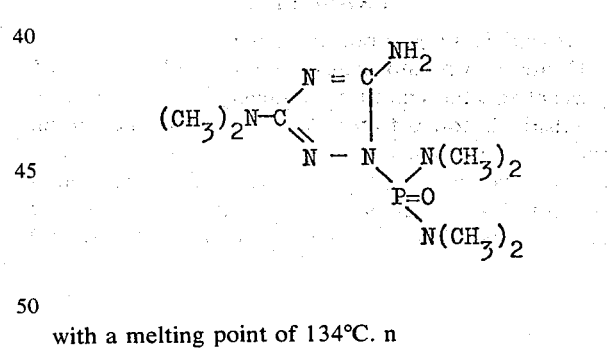

with a melting point of 134°C. n

| | | | | |
|---|---|---|---|---|
| calculated | C 36.80 | H 7.60 | N 37.60 | P 11.90% |
| found | C 36.40 | H 7.50 | N 35.50 | P 11.20% |

The following compound is also manufactured in analogous manner:

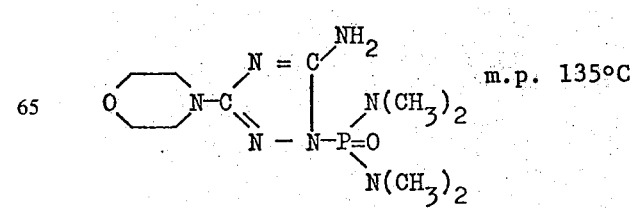
m.p. 135°C

| calculated | C 59.70 | H 7.20 | N 32.40 | P 10.20% |
| --- | --- | --- | --- | --- |
| found | C 39.40 | H 7.29 | N 32.08 | P 10.19% |

EXAMPLE 4

13.2 g of the compound

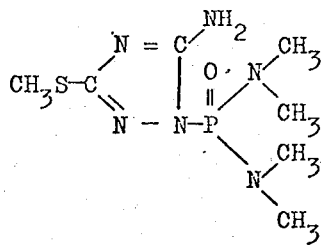

are dissolved in 125 ml of methylene chloride and at 0°C 22.8 g of 40 percent peracetic acid are slowly added dropwise. The mixture is stirred for 6 hours at room temperature, then concentrated in a rotary evaporator, and the residue is stirred with a small amount of water to give 11 g of the compound

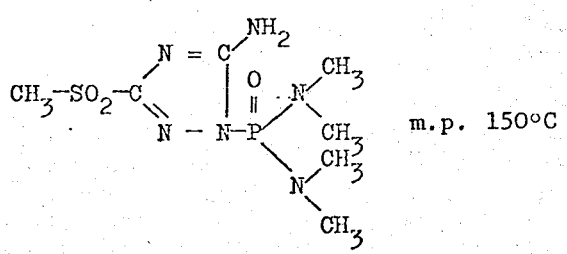

m.p. 150°C

| calculated | C 28.40 | H 5.75 | N 28.40 | P 10.50 | S 10.80% |
| --- | --- | --- | --- | --- | --- |
| found | C 28.80 | H 5.70 | N 28.50 | P 10.60 | S 11.00% |

EXAMPLE 5

A. Insecticidal ingest poison action

Cotton and potato plants were sprayed with a 0.05 percent aqueous emulsion (obtained from a 10 percent emulsifiable concentrate). After the coating had dried, the cotton plants were populated with *Spodoptera littoralis* or *Heliothis virescens* larvae L₃ and the potato plants with Colorado potato beetle larvae (*Leptinotarsa decemlineata*). The test was carried out at 24°C and 60 percent relative humidity. In the above test, the compounds according to Examples 1 to 4 displayed good ingest poison action against *Spodoptera littoralis*, *Heliothis* and *Leptinotarsa decemlineata*.

EXAMPLE 6

B. Systemic insecticidal action

To determine the systemic action, rooted bean plants (*Vicia fabae*) were put into a 0.01 percent aqueous active substance solution (obtained from a 10 percent emulsifiable concentrate).

After 24 hours, aphids (*Aphis fabae*) were placed on the parts of the plant above the soil. The aphids were protected from contact and gas action by means of a special device. The test was carried out at 24°C and 70 percent relative humidity. In the above test the compounds according to Examples 1 to 4 displayed systemic action against this *fabae*.

EXAMPLE 7 a. Action on mites (*Tetranychus urticae*)

To test the acaricidal action, bean leaves which are attacked by adults, rests and eggs of the red spider mite (*Tetranychus urticae*) were treated with a 0.05 percent aqueous emulsion of the substance to be tested (prepared from a 25 percent emulsifiable concentrate). The test was evaluated after 6 days. Strains of the red spider mite which are resistent to phosphoric esters were used as test subjects.

In the above test the compounds according to Examples 1 to 4 acted against *Tetranychus urticae*.

We claim:

1. A compound of the formula

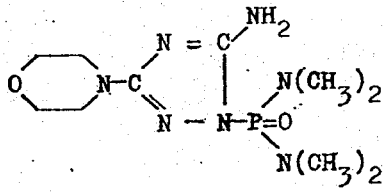

* * * * *